United States Patent [19]
Saylor

[11] 3,930,197
[45] Dec. 30, 1975

[54] VOLTAGE REGULATOR SYSTEM

[76] Inventor: Frederick A. Saylor, Box 231, Leitchs Wharf, Prince Frederick, Md. 20678

[22] Filed: Apr. 25, 1974

[21] Appl. No.: 464,134

[52] U.S. Cl. .................. 322/28; 320/25; 320/40; 320/DIG. 2; 323/34
[51] Int. Cl.² ............................................. H02J 7/24
[58] Field of Search .......... 307/236; 320/25, 27, 29, 320/39, 40, 61, DIG. 2; 322/28, 89, 90, 94; 323/22 SC, 34; 340/248 X, 249, 419

[56] References Cited
UNITED STATES PATENTS

| | | | |
|---|---|---|---|
| 3,151,288 | 9/1964 | Avizienis et al. | 322/28 |
| 3,275,883 | 9/1966 | Watters | 323/22 SC |
| 3,281,816 | 10/1966 | Raymond | 307/236 X |
| 3,304,486 | 2/1967 | Michaels | 323/22 SC |
| 3,315,141 | 4/1967 | Wright et al. | 322/28 X |
| 3,343,060 | 9/1967 | Ingraham | 320/40 |

OTHER PUBLICATIONS
GE SCR Manual, 4th Ed., 1967, pp. 191–195, 283, 286, 506.

*Primary Examiner*—A. D. Pellinen
*Attorney, Agent, or Firm*—Stevens, Davis, Miller & Mosher

[57] ABSTRACT

Apparatus for supplying a regulated voltage to a load comprising a permanent magnet alternator having, preferably, two sets of three-phase windings, one set of the three-phase windings being connected to a power rectifier and the other to a control rectifier. The output of the power rectifier is coupled to the load and to the input of a reference amplifier. The output of the reference amplifier controls an oscillator which provides phase-varying trigger pulses to silicon controlled rectifiers in the power rectifier. A synchronous bias supply is provided by the control rectifier to the reference amplifier and oscillator. The apparatus may be used with a resistive or battery load and is provided with means for protecting the circuit in the event the battery is connected across the regulator with reverse polarity.

11 Claims, 3 Drawing Figures

VOLTAGE REGULATOR SYSTEM

BACKGROUND OF THE INVENTION

This invention relates to voltage regulator systems and more particularly to voltage regulator systems of the type employing a permanent-magnet alternator.

Voltage regulators employing permanent magnet alternators are known and have been used in battery charging systems. Such known voltage regulator circuits generally require for their operation that a battery be connected as a load, and they are subject to severe damage if the battery is connected into the circuit with reversed polarity. It is an object of my invention to provide an improved voltage regulating apparatus which can be used to operate any type of load, including a battery, and which is not damaged if a battery is connected to the circuit with reverse polarity.

SUMMARY OF THE INVENTION

In accordance with my invention, a permanent magnet alternator is provided having, preferably, two sets of three phase windings. The output voltages from the first of these windings is rectified by a power rectifier employing controllable uni-directional current devices, each having two current-carrying electrodes and a control electrode. A typical device of this type is the silicon controlled rectifier (SCR) which is triggered into conduction upon application of a control signal having a given polarity between its gate and cathode. A load is connected across the output of the power rectifier.

The second output of the permanent magnet alternator is rectified by a control rectifier to provide a bias supply which is in synchronism with the voltage supply to the load. The voltage across the load is coupled to a reference amplifier which provides an output voltage determined by the difference between the input voltage across the load and a reference voltage. The output of the reference amplifier is coupled to an oscillator having a pulse output which is coupled back to the uni-directional current devices in the power rectifier. Pulses are supplied to the uni-directional current devices which vary in phase in accordance with the magnitude of the load voltage applied to the reference amplifier.

When a battery is used as a load, a battery polarity sensing circuit is also coupled across the battery and has the function of disabling the oscillator if the battery is connected inadvertently across the power rectifier with reverse polarity. In addition, an overload protection circuit prevents excessive shifting of the phase of the oscillator output in the event of an overload.

DESCRIPTION OF THE PREFERRED EMBODIMENT

Figure 1:
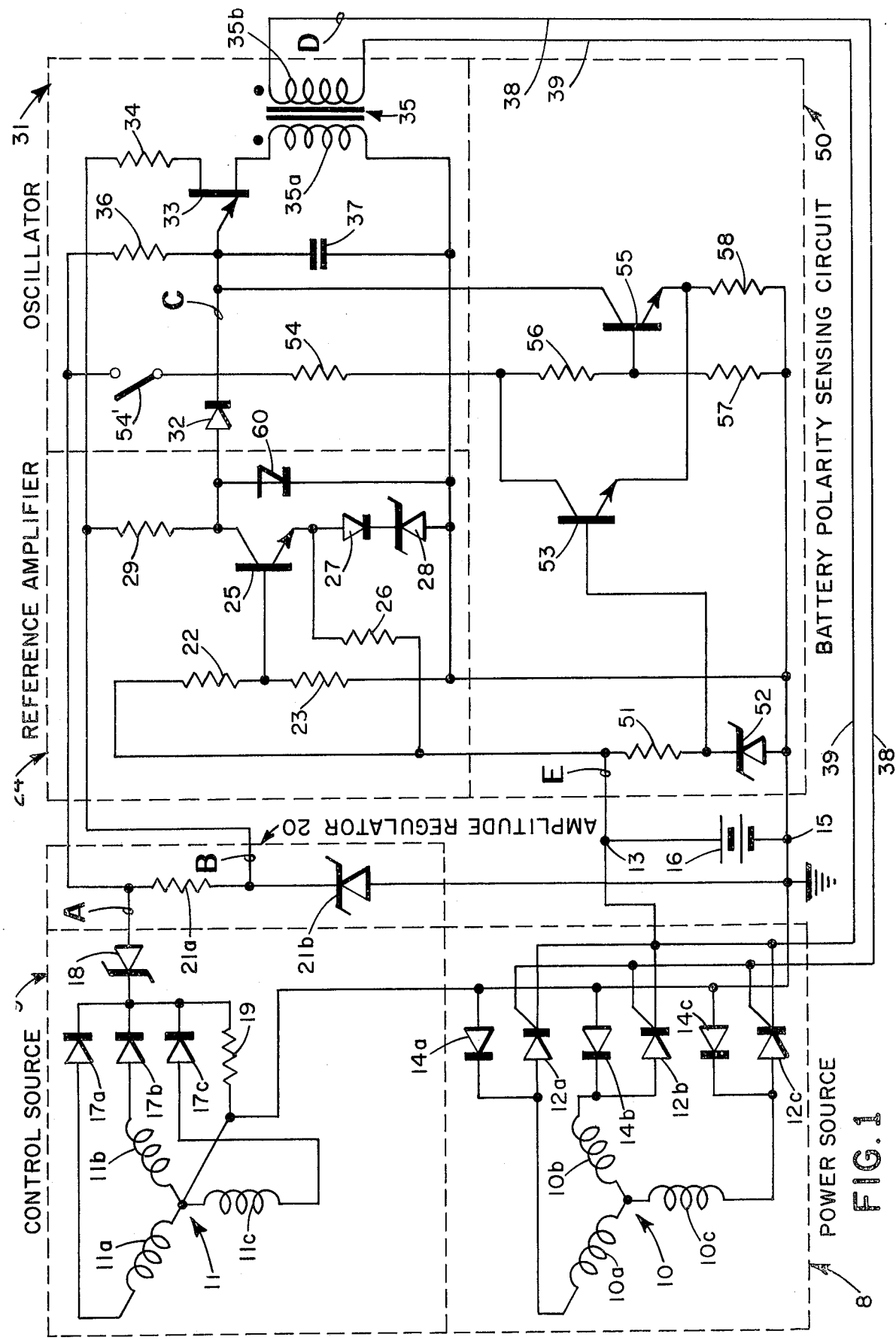
FIG. 1 is a circuit diagram of an embodiment of the invention employing separate power and control windings on a permanent magnet generator.

As shown in FIG. 1, the voltage regulator apparatus of the invention comprises a power source 8 and a control source 9. A single three-phase permanent-magnet alternator having a first three-phase Y-connected winding 10 and a second three-phase Y-connected winding 11 provides power for both sources.

Alternatively, delta connected three-phase windings may be employed, although it should be understood that the invention is not limited to the use of a three-phase power source. The windings are electrically isolated from each other but the voltages across the corresponding coils in windings 10 and 11 are in phase. That is, the voltage across winding 10a is in phase with the voltage across winding 11a, the voltage across winding 10b is in phase with that across winding 11b and the voltage across winding 10c is in phase with the voltage across winding 11c. Windings 10a, 10b and 10c are connected respectively to the anodes of silicon controlled rectifiers (SCR's) 12a, 12b and 12c and the cathode of each of the SCR's is coupled to a positive output terminal 13. Each of the windings 10a, 10b and 10c is also connected to the cathode of a corresponding diode 14a, 14b and 4c, and the anode of each of the diodes is coupled to a grounded load terminal 15. For the purpose of explanation, a battery 16 is shown connected between output terminals 13 and 15 although, as previously explained, operation of the circuit is not restricted to the charging of a battery load. The positive terminal of the battery is connected to terminal 13 and the negative terminal to the grounded terminal 15.

Figure 2:
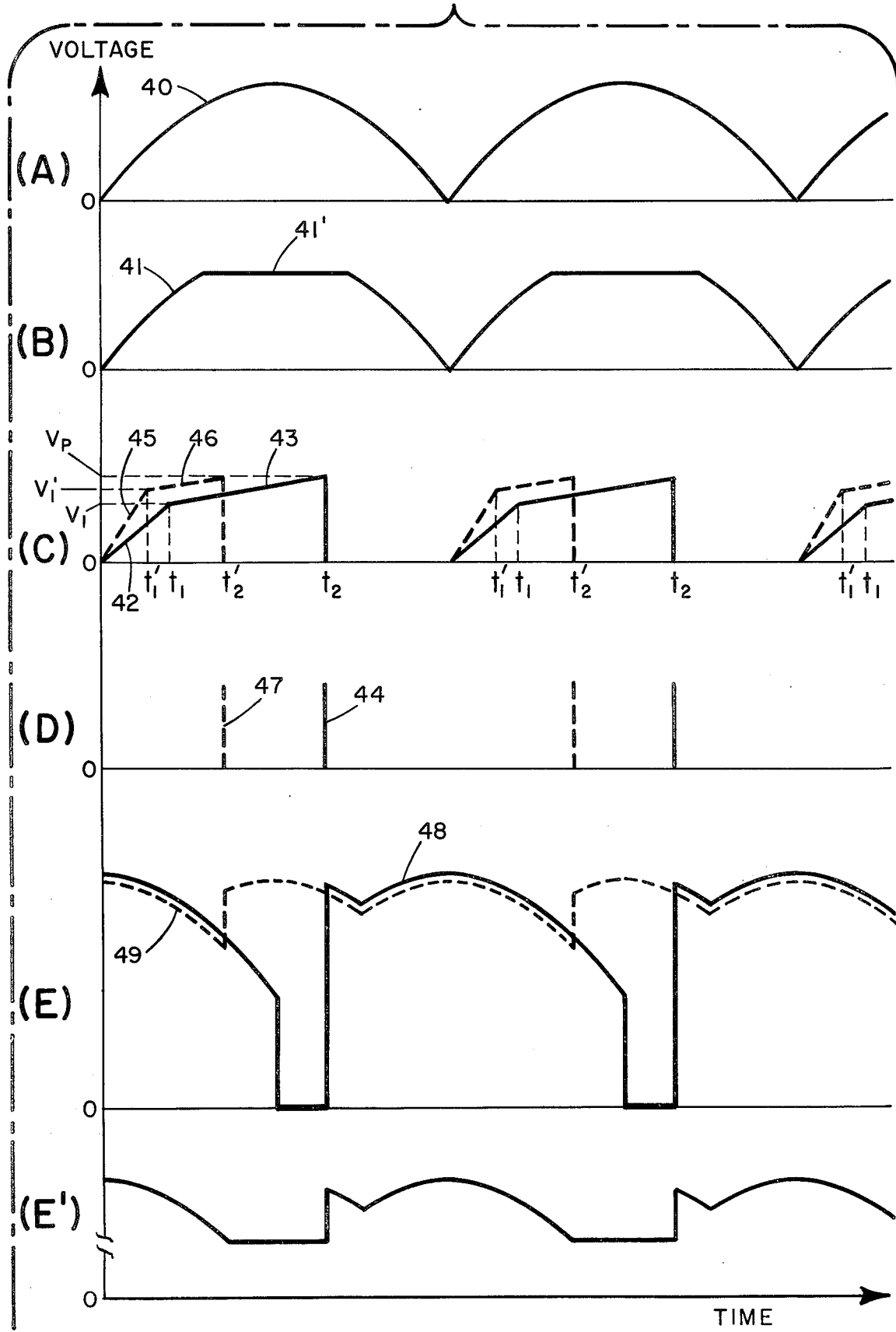
FIG. 2 illustrates idealized voltage waveforms appearing at various points in the circuit of FIG. 1.

The coils 11a, 11b and 11c of three-phase winding 11 are connected to the anodes of diodes 17a, 17b and 17c to rectify the three-phase voltage appearing across the windings and this rectified voltage is coupled through zener diode 18 to a point A. A resistor 19 is connected to the grounded neutral of winding 11. The voltage between point A and ground at the output of the rectifier consisting of diodes 17a – 17c, zener diode 18 and resistor 19, is shown in FIG. 2A.

An amplitude regulator circuit 20 consisting of a resistor 21a and zener diode 21b is connected from point A to ground. The zener diode 21b has the property that the potential drop across its anode and cathode remains substantially constant with changes in current flow through the diode. The amplitude regulator circuit prevents the voltage between the junction of resistor 21a and diode 21b (point B) and ground from exceeding a predetermined value thereby providing a voltage having the waveform shown in FIG. 2B.

The load voltage between terminals 13 and 15 is connected across resistors 22 and 23 of a reference amplifier 24 and the voltage at the junction of these resistors is coupled to the base of a transistor 25. Although type NPN transistors are shown in FIG. 1, it will be understood that type PNP transistors may also be employed. The output voltage at terminal 13 is also connected through a resistor 26 to the emitter of transistor 25 which, in turn, is coupled through a diode 27 and zener diode 28 to ground. The combination of resistor 26 and diodes 27 and 28 comprise a referencing circuit which maintains the voltage at the emitter of transistor 25 relatively constant. Zener diode 28, since it maintains a constant voltage regardless of changes in current flow, keeps the emitter of transistor 25 at a constant voltage. Diode 27 is employed to provide temperature compensation and also to prevent a reverse polarity voltage across the load terminals 13, 15 from damaging transistor 25. The collector of transistor 25 is biased by a resistor 29 connected between the collector and point B of the amplitude regulator.

An oscillator 31 is connected to the output of the reference amplifier 24. Oscillator 31 comprises a diode 32 having its anode connected to the collector of transistor 25 and its cathode connected to the emitter electrode of a unijunction transistor 33. One base of transistor 33 is biased by and connected through a temperature compensating resistor 34 to point B in the amplitude regulator 20 and the other base is connected to one end of the primary winding 35a of a transformer 35. The other end of winding 35a is connected to the grounded load terminal 15. A resistor 36 is connected between point A at the output of the control source rectifier and the emitter electrode of unijunction transistor 33, and a capacitor 37 is coupled between the emitter electrode of the unijunction transistor 33 and ground.

The secondary 35b of transformer 35 is coupled by leads 38 and 39 to SCR's 12a – 12c, lead 38 being connected to the gates of the SCR's and lead 39 to the cathode electrodes. As shown, the relative polarities of the windings of transformer 35 are such that when the end of winding 35a connected to a base of transistor 33 is positive, the lead 38 connected to winding 35b and the gates of SCR's 12a – 12c are also positive.

Under normal load conditions, with the load terminal 13 positive with respect to terminal 15, the zener diode 28 in the emitter circuit of transistor 25 is reverse-biased thereby maintaining the emitter of transistor 25 at a constant potential. The difference between the emitter voltage and that applied to the base of transistor 25 by the voltage divider 22, 23 determines the potential at the collector of transistor 25.

As shown in FIG. 2C, which depicts the voltage waveform between point C and ground for two values of load across terminals 13 and 15, each voltage cycle at the emitter electrode of unijunction transistor 33 has an initial steep rise, then a more gradual rise, and finally a sharp decrease to zero. This occurs because the capacitor 37 is charged initially through resistor 36 and also through resistor 29 and diode 32. When the charge on capacitor 37 has increased to a value at which the voltage at point C is sufficient to reduce the voltage across diode 32 to zero thereby rendering the diode nonconductive, the rate at which capacitor 37 charges decreases since all of the charging current then flows through resistor 36. When the voltage across capacitor 37 reaches the value $V_p$ at which the unijunction transistor 33 conducts, capacitor 37 is discharged through the emitter-base path of transistor 33 causing current to flow through transformer 35 producing a pulse (FIG. 2D) across winding 35b rendering the gate electrodes of SCR's 12a – 12c positive with respect to their cathode electrodes. Accordingly, those SCR's will conduct in which the anode of the SCR is positive with respect to the cathode producing a voltage across the load terminals 13 and 15 as shown in FIGS. 2E and 2E'.

More specifically, assume that the load across terminals 13 and 15 is resistive and of an intermediate value. Under this operating condition, the potential at the collector of transistor 25 will be determined by the fixed voltage at its emitter and the base voltage obtained from the junction of resistors 22 and 23. As the voltage at points A and B increase (as shown at 40 and 41 in FIGS. 2A and 2B) current will flow into capacitor 37 from point A through resistor 36 and from point B through resistor 29 and diode 32 producing an increase in voltage across capacitor 37 as shown by the solid line 42 in FIG. 2C. The amplitude of the voltage at point B is limited by the amplitude regulator 20 as shown at 41' in FIG. 2B. At time $t_1$, the voltage at the cathode of diode 32 becomes equal to that at its anode ($V_1$) as a result of the charging of capacitor 37 and the diode becomes non-conductive. Consequently, the charging rate of capacitor 37 decreases since all of the current is provided through resistor 36. This decreased charging rate produces a decreased rate of rise of the voltage at point C as shown by the solid line 43 in FIG. 2C. The voltage across capacitor 37 continues to increase until at time $t_2$ it reaches a value $V_p$ and the unijunction transistor 33 goes into conduction discharging capacitor 37 through the emitter-base path of transistor 33 and the primary winding 35a of transformer 35. This produces the pulse 44 (FIG. 2D) which turns on one or more of the SCR's 12a – 12c, as previously explained. The voltage across terminals 13 and 15 is shown by the solid line 48 in FIG. 2E.

Assuming now that the load current between terminals 13 and 15 is increased, this increase will cause the voltage applied to the base of transistor 25 to decrease and less current to flow through the collector-emitter path of transistor 25. Consequently, the voltage at the collector of transistor 25 increases to a value $V_1'$ and more current will flow into capacitor 37 causing the voltage across the capacitor to increase at a faster rate as shown by the dashed line 45 in FIG. 2C. The voltage at point C will also increase to a higher value because diode 32 will stop conducting at the higher voltage $V_1'$ due to the increased collector potential of transistor 25. After diode 32 becomes non-conductive at time $t_1'$, the voltage across capacitor 37 continues to increase as shown at 46 in FIG. 2C. This increase is at a slower rate which is the same for all loads since the only charging source for capacitor 37 when diode 32 becomes non-conducting is resistor 36. When the voltage across capacitor 37 reaches $V_p$, transistor 33 becomes conductive and a pulse 47 is generated at time $t_2'$ as shown at 47 in FIG. 2D. Thus, it is seen that any changes in the magnitude of the output voltage across terminals 13, 15 will either advance or retard the trigger pulse (FIG. 2D) during the period of the synchronized three-phase half wave signal as a function of the voltage at the collector of transistor 25. The voltage across the load terminals 13 and 15 for the increased value of load is shown in FIG. 2E by the dashed line 49.

The system may also be used to charge a battery resulting in a voltage across terminals 13 and 15 as shown in FIG. 2E'. The amplitude of the voltage in FIG. 2E' is about the same as in FIG. 2E, the voltage axis of FIG. 2E' having been interrupted as shown to avoid reduction in the size of the voltage waveforms. When a battery is connected to a voltage regulator it is sometimes accidently connected with its terminals reversed and, in prior art systems, this can cause failure of one or more regulator components. In order to prevent such failure, a battery polarity sensing circuit 50 is provided comprising a resistor 51 and zener diode 52 connected across the load terminals 13, 15. The junction of resistor 51 and diode 52 is connected to the base of transistor 53, transistor 53 having its collector connected to point A through a resistor 54 and cutoff switch 54' and to the base of a transistor 55 through a resistor 56. The base of transistor 55 is connected to ground through a resistor 57, its collector is connected to the emitter of unijunction transistor 33 (point c) and the emitters of both transistor 53 and 55 returned to ground through a resistor 58.

When a battery is used as a load, switch 54' is closed and for resistive loads it is placed in the open position shown. If a battery is connected across terminals 13 and 15 with reverse polarity; that is, with its positive terminal connected to terminal 15 and its negative terminal connected to terminal 13, the base of transistor 53 becomes negative with respect to its emitter and transistor 53 is cut-off. Accordingly, its collector potential rises causing transistor 55 to conduct. Since the collector-emitter circuit of transistor 55 is connected across capacitor 37, the capacitor will discharge through transistor 55 and resistor 58 preventing it from charging to a value that will allow the unijunction transistor 33 to fire and trigger the SCR's 12a – 12c.

Connection of a battery across terminals 13 and 15 with proper polarity; that is with the positive terminal connected to terminal 13 and the negative terminal connected to terminal 15, will cause transistor 53 to conduct and cut-off transistor 55. Consequently, the unijunction transistor 33 will operate normally as previously explained. The zener diode 52 also functions to protect the base-emitter circuit of transistor 53 from excessive voltages.

A four-layer diode 60 having its anode connected to the collector of transistor 25 and its cathode to ground provides overload protection for the system. If the collector voltage of transistor 25 reaches the triggering level of diode 60, further advancing of the output conduction angle is prevented since the diode will conduct thereby providing current-limiting in the event of an overload. Under normal operation, diode 60 exhibits a very high impedance and does not affect operation of the system.

Figure 3:
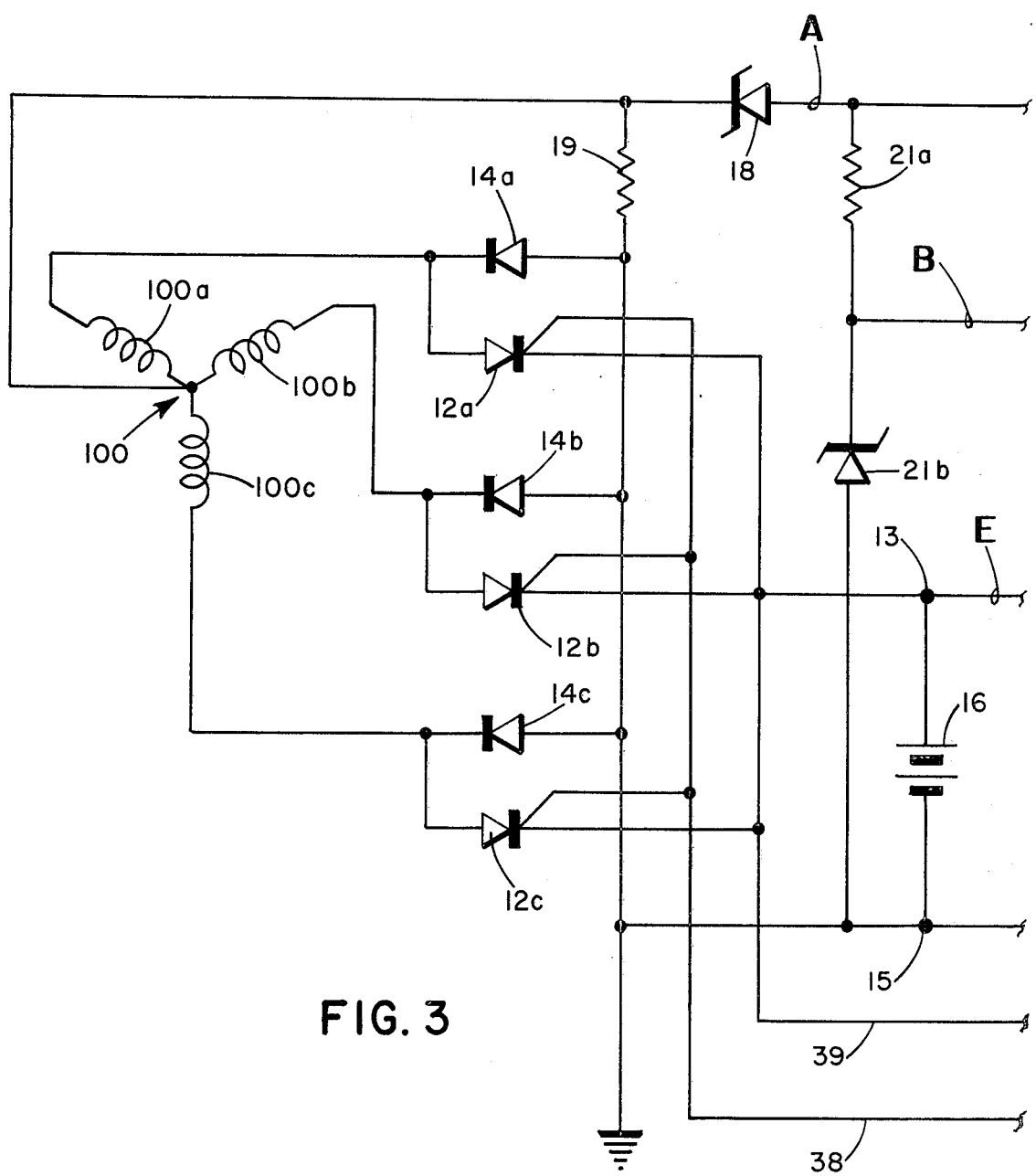
FIG. 3 shows a modification of a part of the circuit of FIG. 1.

FIG. 3 illustrates a power supply for the invention in which the power and control sources have been combined to employ a single three-phase winding 100 having phase windings 100a, 100b and 100c. All components which are the same as in FIG. 1 have been designated by the same numerals and function in the same way as disclosed in connection with FIG. 1. The reference amplifier 24, oscillator 31 and battery polarity sensing circuit 50 have been omitted from the drawing, it being understood that they are part of the circuit of FIG. 3. In FIG. 3, the neutral of the Y-connected three-phase winding 100 is connected to the junction of resistor 19 and zener diode 18 and the other end of resistor 19 connected to the grounded anodes of diodes 14a - 14c thereby permitting the omission of a separate control three-phase winding and its associated rectifiers.

Summarizing, the invention provides a voltage regulator system employing a permanent magnet generator which can be used to charge a battery but is not dependent on the presence of the battery for its operation. Synchronous operation is provided and, when a battery load is used, the circuit is protected against connecting the battery with reverse polarity.

What is claimed is:

1. Apparatus for supplying a regulated voltage to a load comprising,
    a. permanent magnet alternator means for generating an output voltage,
    b. rectifier means coupled between said permanent magnet alternator and said load for rectifying said output voltage, said rectifier means including at least one controllable uni-directional current device having two current carrying electrodes and a control electrode, said device being triggered into conduction upon the application of a control signal of given polarity between said control electrode and one of said two current carrying electrodes,
    c. a reference amplifier having a signal input coupled to said load, a bias input coupled to said rectifier means and an output,
    d. an oscillator having a signal input coupled to the output of said reference amplifier, a bias input coupled to said rectifier means and an output coupled between the control and one electrode of said uni-directional current device, said oscillator applying pulses to said uni-directional current device having a relative phase corresponding to the magnitude of the voltage across said load, and
    e. a battery polarity sensing circuit including a first resistor and a zener diode connected in series across said load; first and second transistors, said first transistor having its base connected to the junction of said first resistor and zener diode, its collector coupled to said rectifier means and to the base of said second transistor and its emitter to the emitter of said second transistor, the collector-emitter circuit of said second transistor being connected to said oscillator, said battery polarity sensing circuit providing a low impedance path to prevent said oscillator from generating output pulses in the event said load is a battery and has been connected with reverse polarity.

2. Apparatus as defined by claim 1 wherein said permanent magnet alternator comprises first and second electrically isolated output windings for generating first and second output voltages, said output voltages being in phase with each other; and wherein said rectifier means comprises a power rectifier and a control rectifier coupled to the first and second windings respectively of said permanent magnet alternator, said uni-directional current device being included within said power rectifier and the bias inputs of said reference amplifier and said oscillator being coupled to said control rectifier.

3. Apparatus as defined by claim 1 wherein said reference amplifier comprises a voltage divider connected to the signal input of said amplifier; a referencing circuit; a resistor; and a transistor, the base and emitter electrodes of said transistor being connected to said voltage divider and referencing circuit respectively, and the collector of said transistor being coupled through said resistor to the bias input thereof.

4. Apparatus as defined by claim 3 wherein said oscillator comprises a unijunction transistor having an emitter and first and second base electrodes; a diode coupled between the collector of the reference amplifier transistor and the emitter electrode of said unijunction transistor; a capacitor; a transformer having first and second windings, said capacitor and the first winding of said transformer being connected between the emitter and first base electrode of said unijunction transistor, the second winding of said transformer being connected to the output of said oscillator; and a resistor coupling the emitter electrode of said unijunction transistor to the bias input of said oscillator.

5. Apparatus as defined by claim 3 wherein the referencing circuit in said reference amplifier comprises a resistor coupled between the emitter electrode of said transistor and one terminal of said load and a zener diode connected between said emitter electrode and the other terminal of said load.

6. Apparatus as defined by claim 5 which further comprises a diode connected between the collector of said transistor and the other terminal of said load, said diode preventing the collector of said transistor from being subjected to an excessive voltage.

7. Apparatus as defined by claim 1 wherein said oscillator comprises a unijunction transistor having an emitter and first and second base electrodes; a diode coupled between the output of said reference amplifier and said emitter electrode; a capacitor; a transformer having first and second windings, said capacitor and the first winding of said transformer being connected between the emitter and first base electrode of said unijunction transistor, the second winding of said transformer being connected to the output of said oscillator; and a resistor coupling the emitter electrode of said unijunction transistor to the bias input of said oscillator.

8. Apparatus as defined by claim 7 which further comprises an amplitude regulator coupled to said rectifier means, said amplitude regulator comprising a resistor and a zener diode connected in series with said resistor, the junction of said resistor and zener diode being coupled to the bias input of said reference amplifier and the second base electrode of said unijunction transistor.

9. Apparatus as defined by claim 8, which further comprises a zener diode coupling said amplitude regulator to said rectifier means.

10. Apparatus as defined by claim 1 wherein said rectifier means includes at least one diode having its cathode coupled to a current carrying electrode of said uni-directional current device and a zener diode coupled to the anode of said diode.

11. Apparatus for supplying a regulated voltage to a load comprising,
  a. permanent magnetic alternator means for generating an output voltage,
  b. rectifier means coupled between said permanent magnet alternator and said load for rectifying said output voltage, said rectifier means including at least one controllable uni-directional current device having two current carrying electrodes and a control electrode, said device being triggered into conduction upon the application of a control signal of given polarity between said control electrode and one of said two current carrying electrodes,
  c. a reference amplifier having a signal input coupled to said load, a bias input coupled to said rectifier means and an output,
  d. a unijunction transistor having an emitter and first and second base electrodes; a diode coupled between the output of said reference amplifier and said emitter electrode; a capacitor; a transformer having first and second windings, said capacitor and the first winding of said transformer being connected between the emitter and first base electrode of said unijunction transistor, the second winding of said transformer being connected to the output of said oscillator; and a resistor coupling the emitter electrode of said unijunction transistor to the bias input of said oscillator, and
  e. a battery polarity sensing circuit including a first resistor and a zener diode connected in series across said load; first and second transistors, said first transistor having its base connected to the junction of said first resistor and zener diode, its collector coupled to said rectifier means and to the base of said second transistor and its emitter to the emitter of said second transistor, the collector-emitter circuit of said second transistor being connected across the capacitor in said oscillator, said battery polarity sensing circuit providing a low impedance path across said capacitor to prevent said oscillator from generating output pulses in the event said load is a battery and has been connected with reverse polarity.

* * * * *